UNITED STATES PATENT OFFICE.

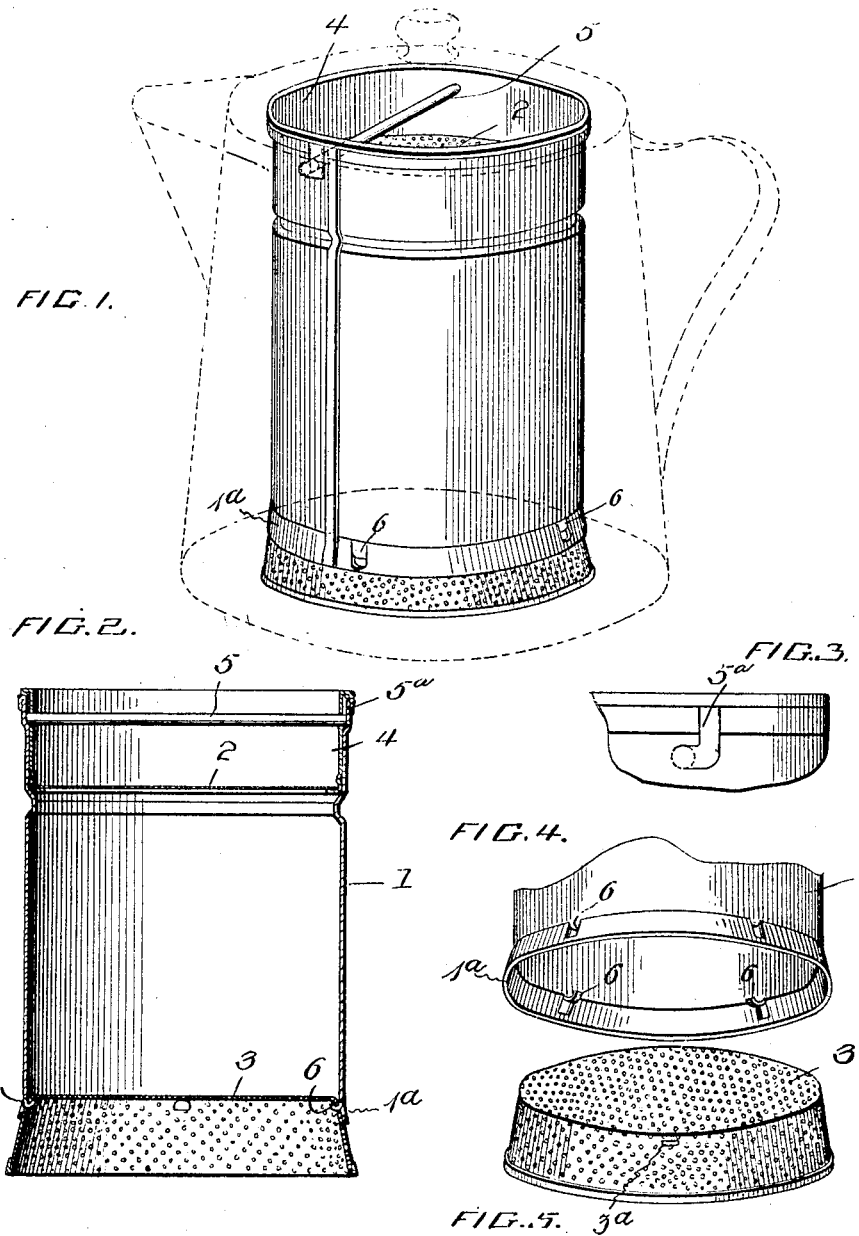

THOMAS R. GRACIE, OF PITTSBURG, PENNSYLVANIA.

ATTACHMENT FOR COFFEE-POTS AND THE LIKE.

No. 904,949.      Specification of Letters Patent.      Patented Nov. 24, 1908.

Application filed August 14, 1908. Serial No. 448,542.

*To all whom it may concern:*

Be it known that I, THOMAS R. GRACIE, a citizen of the United States, residing at Pittsburg, in the county of Allegheny and State of Pennsylvania, have invented certain new and useful Improvements in Attachments for Coffee-Pots or the Like, of which the following is a specification.

The object of this invention is to provide a simple form of attachment or device to be used in connection with coffee and tea pots particularly to contain the coffee or tea while the same is in the water and during the operation of brewing the mixture.

The invention consists essentially of improvements in devices for the above purpose conducive to simplicity of structure, cheapness, and adding to the general desirability thereof.

For a full understanding of the invention, reference is to be had to the following detail description and to the accompanying drawings, in which—

Figure 1 is a view showing a coffee pot in dotted lines and the invention arranged therein and shown in full lines; Fig. 2 is a vertical sectional view of the invention; Fig. 3 is a fragmentary view bringing out more clearly the connection between the upper strainer and the body of the device; Fig. 4 is a fragmentary perspective view of the lower portion of the body, and Fig. 5 is a perspective view of the screen detached from the body.

Throughout the following detail description and on the several figures of the drawings, similar parts are referred to by like reference characters.

In its preferred embodiment the invention consists primarily of a structure composed of three parts, a cylindrical body 1, a top strainer 2, and a bottom strainer 3. The peculiar formation and manner of connecting the above parts constitutes the present invention. It is contemplated that the body 1 of the device shall be made of various sizes in the practical use of the invention, and according to the various sizes of the pots or receptacles in which the devices comprising the invention are to be arranged.

The body 1 is preferably made of tin, aluminum, or light metal, and is imperforate throughout its length. The strainer 2 is applied to a rim 4 which is adapted to fit within the upper end of the body 1 and which is provided with a cross bar 5 to be readily grasped in order to remove or replace the strainer 2 when it is desired to fill the body 1 with coffee, or the like, or to remove the contents of the device. To provide a positive connection between the body 1 and the strainer 2 so that the latter will not be accidentally displaced when the bar 5 is grasped to elevate the device and remove it from the pot or receptacle in which it is located, the ends of the bar 5 are extended through the rim 4 so as to enter bayonet grooves 5ª in the opposite side portions of the body 1. The end extensions of the bar 5 form projections which readily interlock with the bayonet grooves by slight turning movement of the strainer 2.

The lower strainer 3 of the device is also peculiarly connected with the body 1. It is preferred that the lower extremity of the body 1 be slightly flared, as shown at 1ª, so as to provide a seat adapted to receive the upper portion of the strainer 3, the latter being of frusto-conical form, so as to fit snugly in the seat 1ª. The upper and side portions of the strainer 3 are perforated, and the strainer is positively connected with the body 1 by means of short lugs or lips 6 bent from the lower end of the body and passing through openings 3ª in the upper portion of the strainer 3. The lugs or lips 6 after being passed through the openings 3ª in the strainer 3 are thence bent upwardly to firmly attach the strainer to said body.

In the actual use of the invention the device above described is arranged in the pot or receptacle in which a mixture is to be brewed and will contain the granular or other material or substance from which the flavor of the mixture is derived.

In the making of coffee for instance, the ground coffee will be placed within the body 1 and between the strainers 2 and 3. By using the device the coffee is not permitted to mix with the body of the water in the pot in which the invention is arranged and the mixture when brewed will be of a much better flavor than when made in the customary way. The invention is possessed of a number of advantages from the standpoint of structure and also in the general use thereof.

Having thus described the invention, what is claimed as new, is:

1. A device of the class described comprising a hollow cylindrical body, a removable strainer applied to the upper open end of the body, and a strainer permanently applied to the lower open end of the body, the lower end of the body being flared to form a seat and the lower strainer being of hollow frusto-conical form so that its upper portion fits snugly in said seat, and lips bent from the lower end of the body and extending through the lower strainer so as to firmly attach the same to said body.

2. A device of the class described comprising a hollow cylindrical and imperforate body having its lower extremity flared to provide a seat, a strainer comprising a hollow frusto-conical body perforated at its top and sides and having its upper end received in the seat aforesaid, lips bent from the body of the device adjacent to said strainer and firmly attaching the strainer thereto by engagement therewith, and a removable strainer at the upper open end of the body of the device, said removable strainer including a rim received in the cylindrical body, and a cross bar extending through opposite sides of the rim, the cylindrical body having bayonet grooves receiving the extremities of said cross bar.

In testimony whereof I affix my signature in presence of two witnesses.

THOMAS R. GRACIE.

Witnesses:
 HARRY W. LEECH,
 I. E. LIEBEGOTT.